W. C. FARNUM.
ELASTIC GEAR, OBLIQUE TOOTH.
APPLICATION FILED AUG. 10, 1918.
1,361,035.
Patented Dec. 7, 1920.
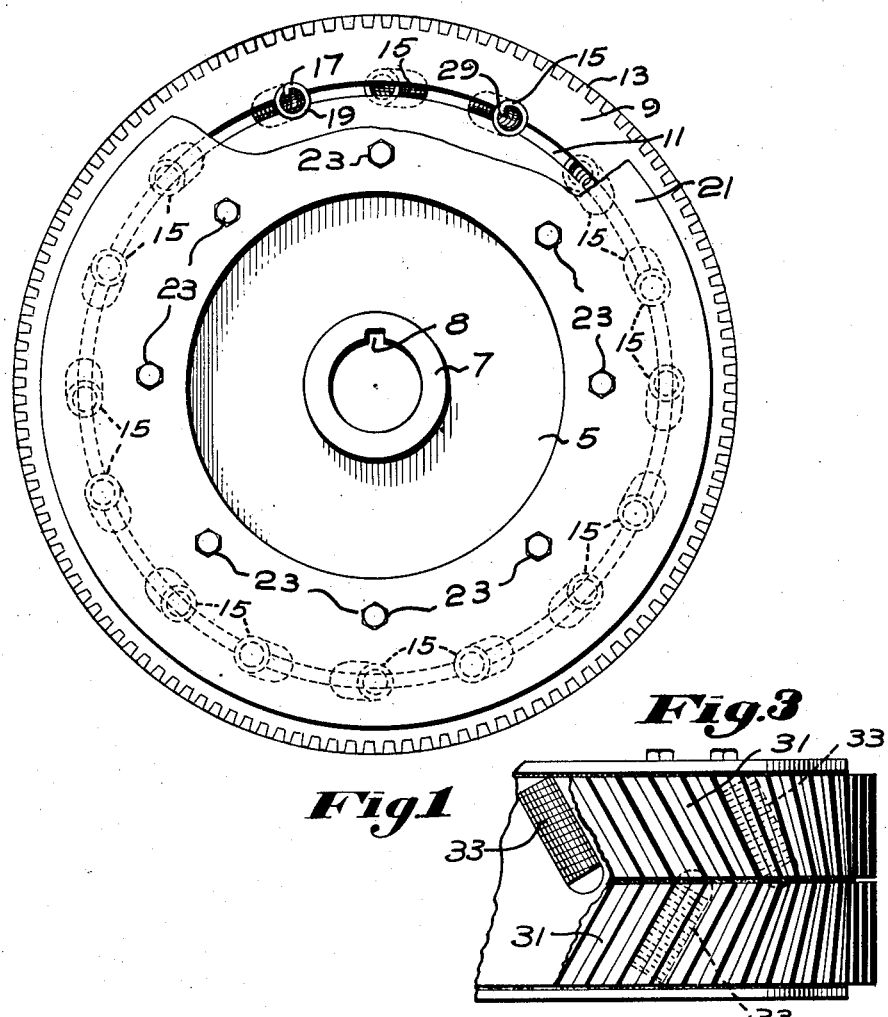
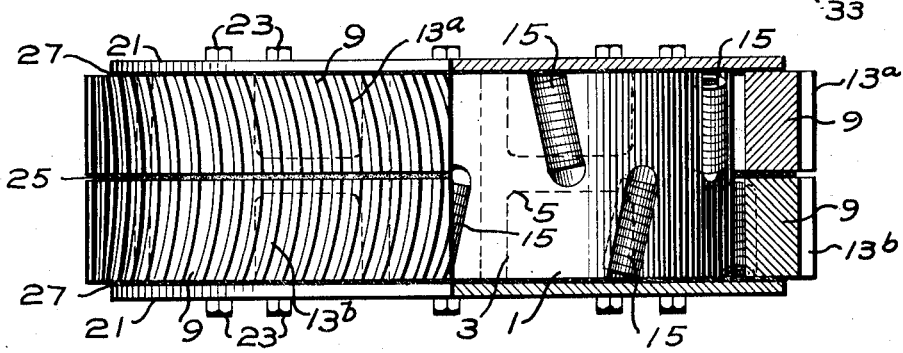
Inventor:
William C. Farnum
by Robt P Harris
Attorney

UNITED STATES PATENT OFFICE.

WILLIAM C. FARNUM, OF WINCHENDON, MASSACHUSETTS.

ELASTIC GEAR, OBLIQUE TOOTH.

1,361,035.   Specification of Letters Patent.   Patented Dec. 7, 1920.

Application filed August 10, 1918. Serial No. 249,253.

*To all whom it may concern:*

Be it known that I, WILLIAM C. FARNUM, a citizen of the United States, residing at Winchendon, county of Worcester, and State of Massachusetts, have invented an Improvement in Elastic Gears, Oblique Teeth, of which the following description, in connection with the accompanying drawings, is a specification, like characters on the drawings representing like parts.

The present invention relates to power transmission gears, and more particularly to elastic gears having spring means to connect a rotary part with a toothed ring or part yieldingly to transmit rotary movement from one to the other.

The present invention is directed to such elastic gears, but instead of having straight teeth, the rim of the gear has curved or herring-bone teeth. Heretofore, gears having curved teeth have been found to intermesh so that the transmission thrust of the curved tooth of a driving gear is localized to a point or small portion of a tooth of the driven gear, with the result that the full strength of the teeth is not utilized, and as a consequence, the teeth have become quickly worn and frequently broken.

An important object therefore of the present invention, is to provide an elastic gear having curved teeth divided into separate sections formed on independent rings which are flexibly connected to the body of the gear, and therefore, are susceptible of relative rotative movement such that the sections of the teeth may automatically adapt themselves to the curvature of the teeth of the gear meshing therewith, and render available the full width of the gears in transmitting power.

The character of the invention will be best understood by reference to the following description of good forms thereof shown in the accompanying drawing, wherein:

Figure 1 is a side elevation of a curved tooth gear embodying the invention, a portion thereof being broken away to disclose parts beyond;

Fig. 2 is a view partly in plan and partly in section of said gear; and

Fig. 3 is a view of a herring-bone gear embodying the invention.

Referring to the drawing, the gear shown in Figs. 1 and 2 embodying the invention, comprises a body 1 having a rim 3 connected by a web 5 with a hub 7 which may have a keyway 8 for receiving a key to connect the same with a shaft. A plurality of rings or rims 9, in the present instance, two being shown, encircle said body and preferably are sufficiently large to have annular spaces 11 between them.

The peripheries of the rims 9, in the present form of the invention, have curved teeth 13 formed thereon, a section 13$^a$ of a tooth being on one ring, and a section 13$^b$ of said tooth being on the other ring, the construction being such that one section forms in effect a continuation of the other.

The means for flexibly or yieldingly connecting the rims 9 to the body of the gear, in the present instance, comprises coil springs 15 seated in opposed grooves or recesses 17 and 19 formed in said rims and body, respectively. Said grooves or recesses extend obliquely to the axis of the gear, and preferably are tangent to the mid points of the curves of the tooth sections. The series of coil springs for one rim will therefore be oblique to the series of coil springs for the other rim.

The pressure of the driving gear teeth on the sections of the curved teeth tends to thrust said sections outward away from one another, but since the coil springs are obliquely disposed, they effectively prevent such outward movement of the sections.

The inner ends of the grooves or recesses receiving the coil springs may be closed to limit the springs against inward movement. Outward movement of said springs may be limited by ring plates 21 at the opposite sides of the body and of a width sufficient to overlap the outer faces of the rims, said ring plates being secured to said body by suitable screw bolts 23.

A packing ring 25 of rawhide or other suitable material may be interposed between the inner faces of the rims, and packing rings 27 of similar material may be interposed between the ring plates 21 and the outer faces of the rims. These packing rings may yield somewhat to allow slight lateral movement of the rims relatively to the body of the gear.

To facilitate insertion of the coil springs into their grooves or recesses, each spring may have an inturned end 29 adapted to be engaged by the grooved shank of a suitable tool, so that the convolutions of the springs may be contracted sufficiently to allow ready insertion of the springs into the opposed recesses or grooves therefor. When the tool is removed the spring will expand into close frictional engagement with said grooves.

In operation, when a usual curved tooth gear meshes with the elastic gear described, the rings carrying the sectional teeth may yield relatively to one another, so that both sections of each tooth will engage the full face of a tooth of the other gear and both share the driving load, and thus the teeth will automatically maintain themselves in correct working condition. As a consequence, wear on the teeth is reduced and their life is desirably prolonged.

The coil springs will also prevent undue shock on the teeth, ease the starting and arrest of the gears, prevent breakage, and materially reduce the noise of operation.

In some cases the teeth sections instead of being curved may be straight and incline inward toward one another, as shown at 31 in Fig. 3, producing a herring-bone gear. In this form of the invention coil springs 33 connect the body with the rims or rings, and extend parallel to the straight sections of the teeth. In this construction the straight sections of each tooth will both share the transmission load from the full width of the tooth of the gear meshing therewith.

It will be understood that the invention is not limited to the specific embodiments shown, but that various deviations may be made therefrom without departing from the spirit and scope of the appended claims.

What is claimed is:—

1. An elastic gear comprising a rotary body, a plurality of rings thereon disposed side-by-side and provided with curved teeth sections, the teeth sections of one of said rings being in effect continuations of the teeth sections of the other ring, said body and rings having opposed recesses therein extending obliquely to the axis of said body and tangentially to the curved teeth sections, and coil springs mounted in said recesses and extending in the tangential direction thereof to yieldingly connect said rings with said body and oppose relative outward movement of the teeth sections in the general direction of the axis of said body.

2. An elastic gear comprising a rotary body, a pair of rings thereon disposed side-by-side and provided with teeth sections in converging relation, said body and rings having opposed recesses, the opposed recesses of the body and one of the rings and the opposed recesses of the body and the other ring being in converging relation, and coil springs mounted in said recesses for yieldingly transmitting rotary motion from said body to said rings and tending to prevent movement of said rings outward axially of said body.

3. A composite gear of the herring-bone type, comprising a wheel-like body, a pair of rings positioned about the same and provided with inclined teeth, means for yieldingly securing said rings upon said body to permit a slight rotative movement therebetween, including coil springs mounted between each ring and the adjacent portion of said body at an angle substantially the same as the angle of the teeth surrounding the springs, said springs mounted in alined recesses formed in each ring and the adjacent portion of said body, and means for retaining said springs in said recesses.

In testimony whereof, I have signed my name to this specification.

WILLIAM C. FARNUM.